US006484169B1

(12) United States Patent
Wilsford

(10) Patent No.: US 6,484,169 B1
(45) Date of Patent: Nov. 19, 2002

(54) SELECTION AND ORDERING OF LAMP COMPONENTS

(75) Inventor: Melinda J. Wilsford, Scio, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/491,012

(22) Filed: Jan. 25, 2000

(51) Int. Cl.[7] .......................... G06F 17/30; G06F 17/60

(52) U.S. Cl. ................................ 707/6; 707/3; 705/22; 705/26

(58) Field of Search ....................... 707/1–10, 100–104, 707/200–201, 500, 526, 513, 527; 705/1, 10, 26–30, 22, 17

(56) References Cited

U.S. PATENT DOCUMENTS 5,890,138 A * 3/1999 Godin et al. .................. 705/26
6,167,380 A * 12/2000 Kennedy et al. .............. 705/10
6,327,574 B1 * 12/2001 Kramer et al. ................ 705/14

* cited by examiner

*Primary Examiner*—Alford W. Kindred
(74) *Attorney, Agent, or Firm*—Fay, Sharpe, Fagan, Minnich & McKee, LLP

(57) ABSTRACT

A system for supplying product information to a user by means of a computer interface at a client computer. A server computer supplies a list of product choices to the client computer so that a user can select one or more items from the list of product choices which in an exemplary embodiment is lamp component selections. The server computer responds to the user selection of the one or more items by providing a number of options concerning one or more characteristics of the product. The user chooses from the available options and the server searches a database for one or more products that produce a best fit to the customer specifications and conveying the results of said search to the user by means of the interface. A preferred system uses web pages to present the interface to the user and communications between the server and the client is via the internet.

23 Claims, 18 Drawing Sheets

Molybdenum Wire Product Selection

If you know the item number and want to check on current availability, type it here:

[_____] ~73a

If you want to find the best product available for your application, fill out this section:

Rate the importance of each characteristic to your application
(1-low importance, 5-high importance)

| | |
|---|---|
| Uniform Filament Contraction | 1 |
| Room temperature formability (flattening and crimping) | 1 |
| 200 Degrees C formability (flattening and crimping) | 3 |
| Recrystallization Temperature | 5 |
| High Temperature Strength | 5 |

} GENERAL CRITERIA

Ductility maintained after exposure to:
○ 1450 C Max    ○ 1450-700 C    ● 1700-1900 C Desired Finish  [Cleaned/Annealed ▼]

Diameter   Min [18]    Max [24]
○ mm
● mils
○ mg/200mm

Tolerance +/- [3] %

} SPECIFIC CRITERIA

Customer Number [_____]
(if new customer, fill out information below)

Name [_____]
Title [_____]
Email [_____]
Company Name [_____]
Address [_____]
City [_____]
State [_____]
Country [_____]
Zip Code [_____]

↖ 62

160 ~[ Submit ]    [ Cancel ]~ 162

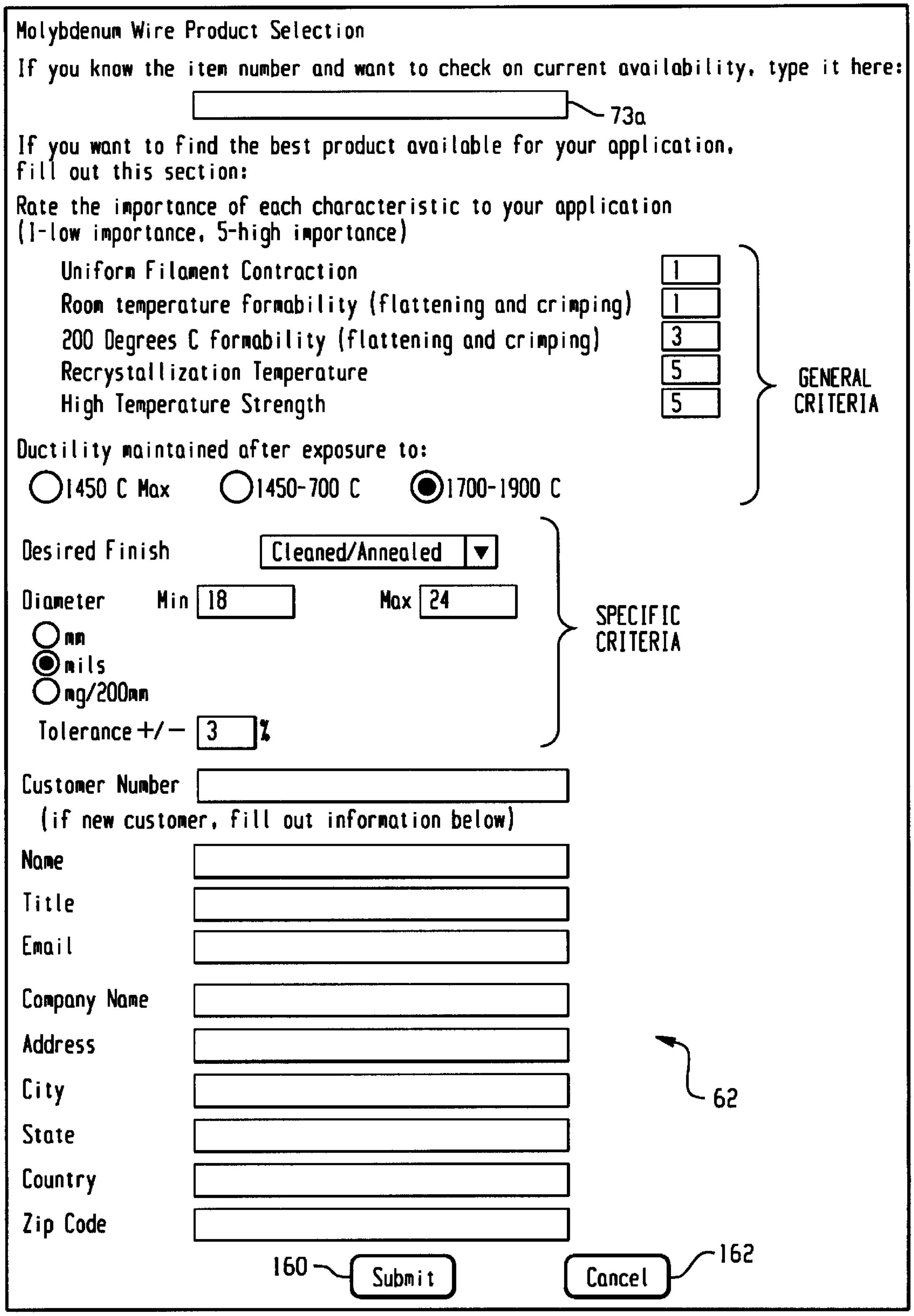

*Fig. 4*

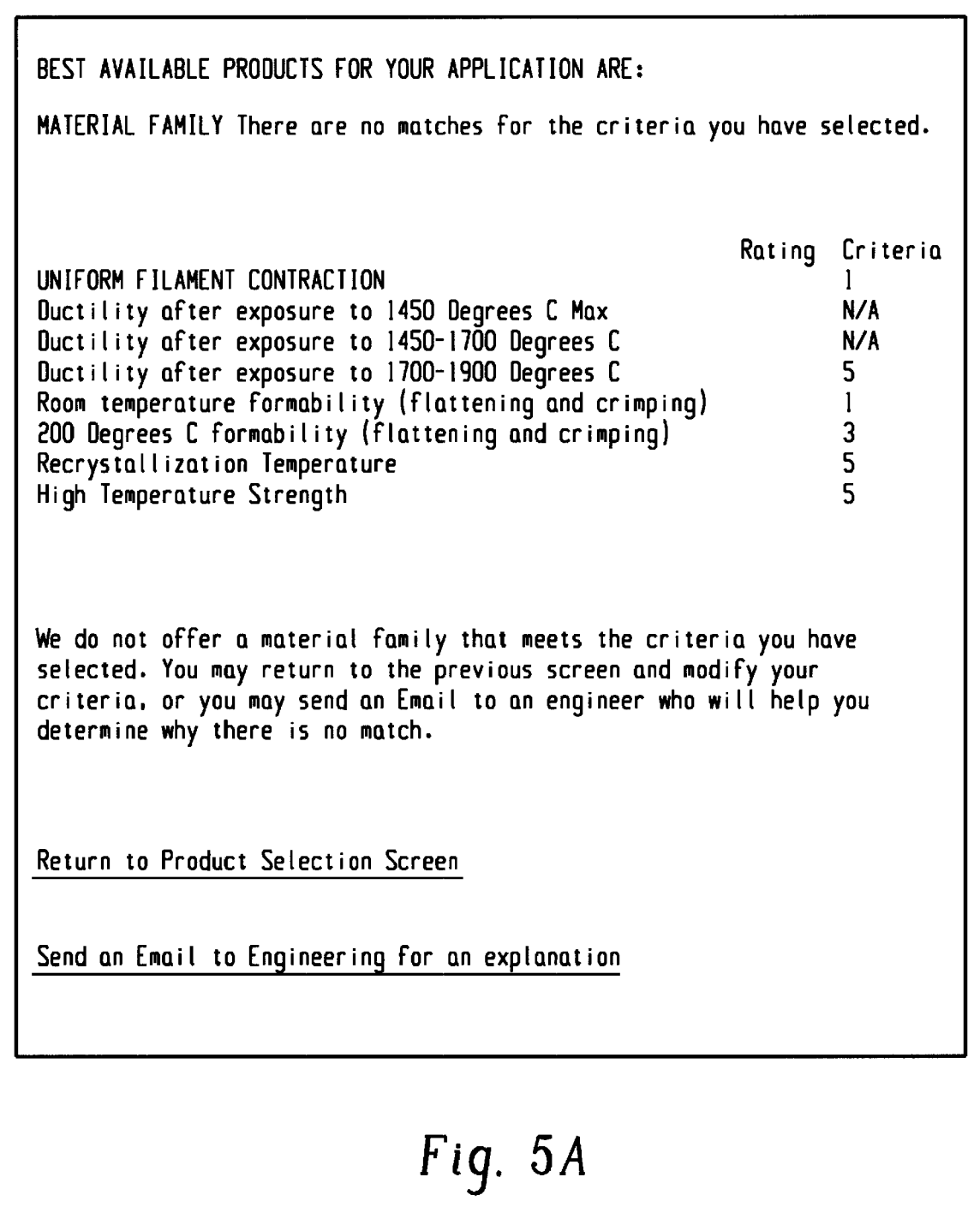

BEST AVAILABLE PRODUCTS FOR YOUR APPLICATION ARE:

MATERIAL FAMILY There are no matches for the criteria you have selected.

| | Rating | Criteria |
|---|---|---|
| UNIFORM FILAMENT CONTRACTION | | 1 |
| Ductility after exposure to 1450 Degrees C Max | | N/A |
| Ductility after exposure to 1450-1700 Degrees C | | N/A |
| Ductility after exposure to 1700-1900 Degrees C | | 5 |
| Room temperature formability (flattening and crimping) | | 1 |
| 200 Degrees C formability (flattening and crimping) | | 3 |
| Recrystallization Temperature | | 5 |
| High Temperature Strength | | 5 |

We do not offer a material family that meets the criteria you have selected. You may return to the previous screen and modify your criteria, or you may send an Email to an engineer who will help you determine why there is no match.

Return to Product Selection Screen

Send an Email to Engineering for an explanation

Fig. 5A

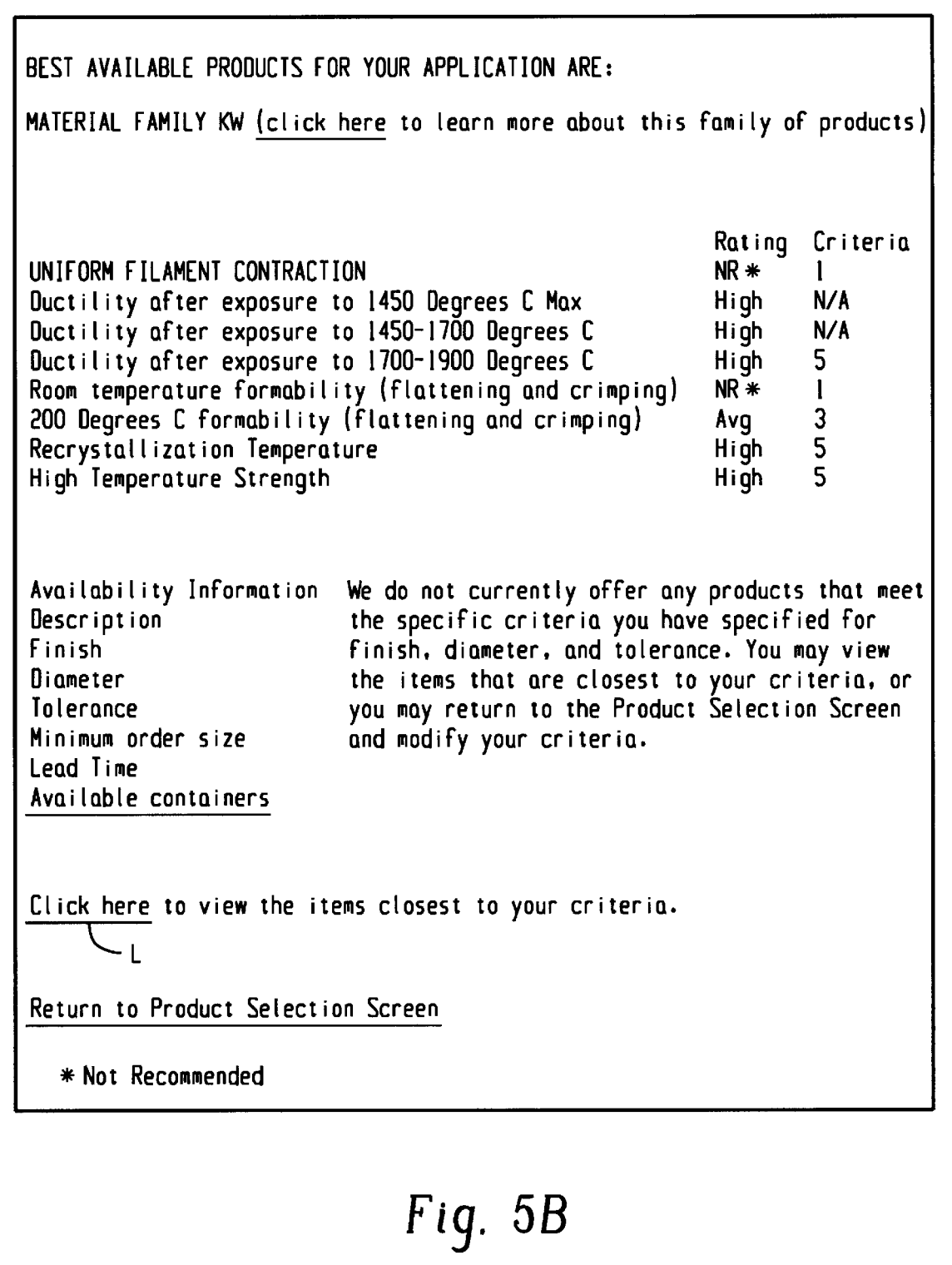

BEST AVAILABLE PRODUCTS FOR YOUR APPLICATION ARE:

MATERIAL FAMILY KW (click here to learn more about this family of products)

| | Rating | Criteria |
|---|---|---|
| UNIFORM FILAMENT CONTRACTION | NR* | 1 |
| Ductility after exposure to 1450 Degrees C Max | High | N/A |
| Ductility after exposure to 1450-1700 Degrees C | High | N/A |
| Ductility after exposure to 1700-1900 Degrees C | High | 5 |
| Room temperature formability (flattening and crimping) | NR* | 1 |
| 200 Degrees C formability (flattening and crimping) | Avg | 3 |
| Recrystallization Temperature | High | 5 |
| High Temperature Strength | High | 5 |

| | |
|---|---|
| Availability Information<br>Description<br>Finish<br>Diameter<br>Tolerance<br>Minimum order size<br>Lead Time<br>Available containers | We do not currently offer any products that meet the specific criteria you have specified for finish, diameter, and tolerance. You may view the items that are closest to your criteria, or you may return to the Product Selection Screen and modify your criteria. |

Click here to view the items closest to your criteria.

L

Return to Product Selection Screen

* Not Recommended

*Fig. 5B*

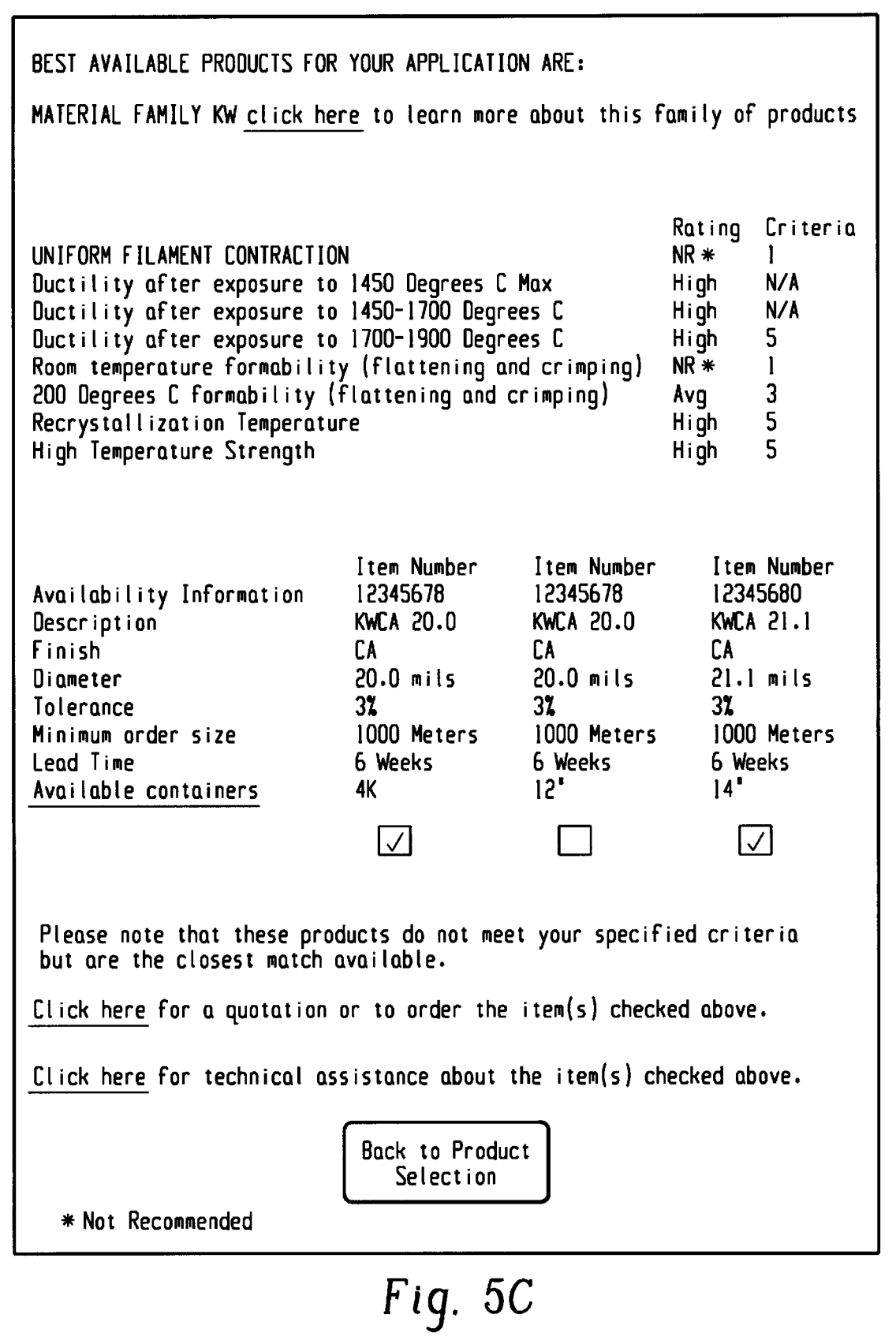

BEST AVAILABLE PRODUCTS FOR YOUR APPLICATION ARE:

MATERIAL FAMILY KW click here to learn more about this family of products

| | Rating | Criteria |
|---|---|---|
| UNIFORM FILAMENT CONTRACTION | NR* | 1 |
| Ductility after exposure to 1450 Degrees C Max | High | N/A |
| Ductility after exposure to 1450-1700 Degrees C | High | N/A |
| Ductility after exposure to 1700-1900 Degrees C | High | 5 |
| Room temperature formability (flattening and crimping) | NR* | 1 |
| 200 Degrees C formability (flattening and crimping) | Avg | 3 |
| Recrystallization Temperature | High | 5 |
| High Temperature Strength | High | 5 |

| | Item Number | Item Number | Item Number |
|---|---|---|---|
| Availability Information | 12345678 | 12345678 | 12345680 |
| Description | KWCA 20.0 | KWCA 20.0 | KWCA 21.1 |
| Finish | CA | CA | CA |
| Diameter | 20.0 mils | 20.0 mils | 21.1 mils |
| Tolerance | 3% | 3% | 3% |
| Minimum order size | 1000 Meters | 1000 Meters | 1000 Meters |
| Lead Time | 6 Weeks | 6 Weeks | 6 Weeks |
| Available containers | 4K | 12" | 14" |
| | ☑ | ☐ | ☑ |

Please note that these products do not meet your specified criteria but are the closest match available.

Click here for a quotation or to order the item(s) checked above.

Click here for technical assistance about the item(s) checked above.

Back to Product Selection

* Not Recommended

*Fig. 5C*

Product Quotation / Order Form

Enter your customer number [_____] ⟵ 252

New Customers <u>Click here</u> to register
⟵ 254

| Line | Item Number | Description | Quantity | Data Desired |
|------|-------------|-------------|----------|--------------|
| 001  | 12345678    | KWCA 20.0 4K | 15,000  | 12/1/1999    |
| 002  | 12345680    | KWCA 21.1 14' | 15,000 | 12/1/1999    |
|      |             |             |          |              |

256

To receive a quotation via Email within 24 hours, <u>Click here</u>.
⟵ 258

To order this material, <u>Click here</u>. You will receive acknowledgement of your order, including price and ship date, via Email within 24 hours. If any information pertaining to your order changes, you will receive notification by Email of the changes.

260

[ Cancel ]

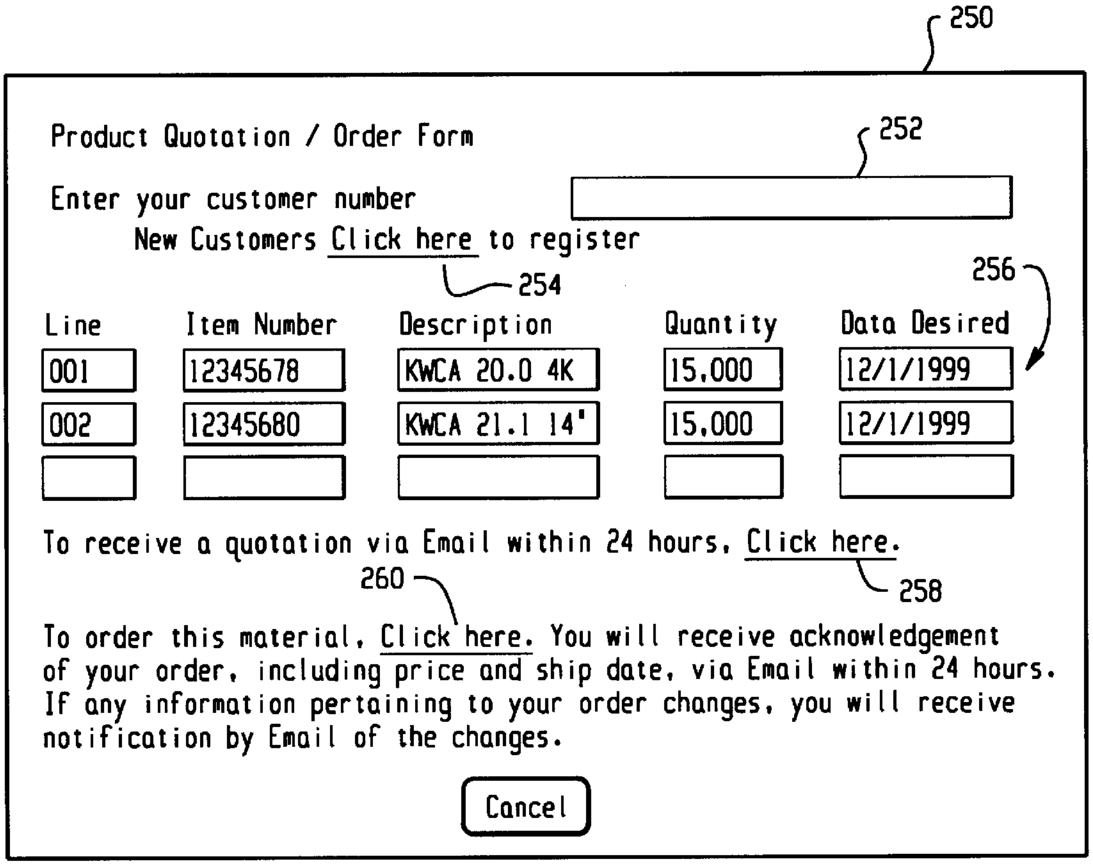

PRODUCT CATEGORY GUIDE

FORMED COMPONENTS

<u>NICKEL</u>
<u>STAINLESS STEEL</u>
<u>COPPER</u>

WIRE

104 ⟶ <u>MOLYBDENUM</u>
<u>TUNGSTEN</u>

<u>GLASS</u>   ⟵ 102

<u>ORDER PRODUCT</u>

100

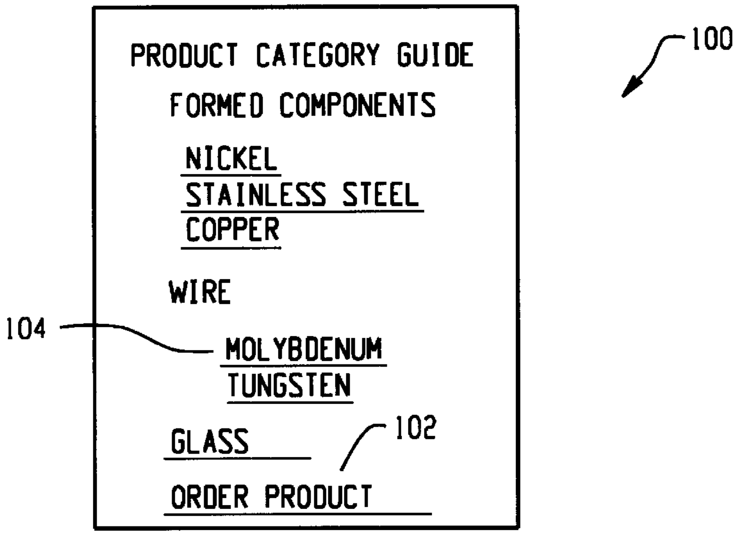

*Fig. 7*

SELECTION AND ORDERING OF LAMP COMPONENTS

FIELD OF THE INVENTION

The present invention concerns the automated selection of lamp components based on user supplied inputs and access to a database of component information based on the user supplied inputs.

BACKGROUND ART

Customers trying to purchase or find out about lamp components have traditionally called customer service representatives. After explaining their lamp needs, the customers have been told what products the lamp manufacturer had available to satisfy those needs. The customer service representative may have been using out of date information to try to match the customers stated needs with the products then available. Additionally, customers frequently want more information than they can get from a brochure or other documentation available to the customer service representative.

SUMMARY OF THE INVENTION

The present invention allows a potential customer to specify a product option or criteria and rapidly receive accurate up to the date product descriptions that most closely match that criteria.

One exemplary embodiment of the present invention features a method of supplying product information to a user by means of a computer interface. The interface presents a list of product choices and a means for a user to select one or more items from the list of product choices. In response to this selection a response is displayed which provides a number of options concerning one or more characteristic of the product. A user then makes choices concerning those options and based on these choices by the user, a computer searches a database for one or more products that produce a best fit to the customer specifications and conveying the results of said search to the user.

An exemplary embodiment of the present invention is performed by means of a computer server which accesses a database or databases concerning product characteristics and availability. An interface is presented on a viewing screen of a client computer with which the server computer communicates. This communications can occur over the Internet or via other suitable computer networks such as a local area network. The presently preferred interface is by means of Web pages that are viewed on a browser on the client computer.

These and other objects advantages and features of the invention will become better understood through a review of the following detailed description of an exemplary embodiment of the invention when considered in conjunction with the accompanying drawings.

BRIEF DESCRIPTION OF THE DRAWINGS

FIGS. 4, 5, 5A, 5B, 5C, 6 and 7 are illustrative web page depictions of user interfaces used in conjunction with the exemplary embodiment of the present invention.

EXEMPLARY EMBODIMENT FOR PRACTICING THE INVENTION

Figure 1:
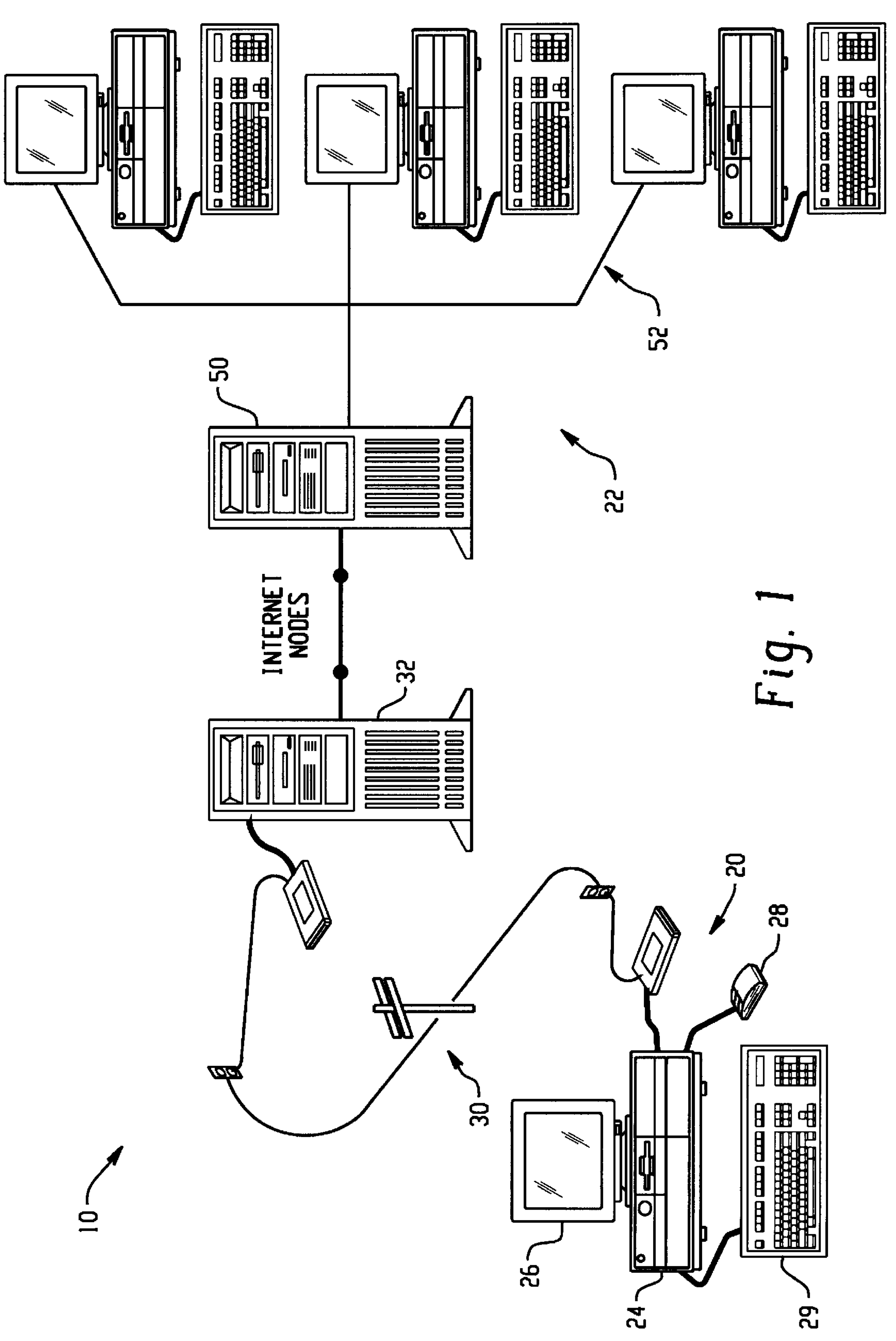
FIG. 1 is an overview of a computer system including a server computer and a client computer for communicating with each other by means of a wide area network such as the Internet.

FIG. 1 depicts two nodes 20, 22 of a wide area network 10 such as the Internet used in practicing an exemplary embodiment of the present invention. A first node 20 is a client node and contains a personal computer 24 running typical applications programs such as word processing and communications software. Installed on the personal computer 24 is so called browser software for navigating web sites on the world wide web. The world wide web is group of internet nodes that conform to standards promulgated by the World Wide Web Consortium.

FIG. 1 also includes a schematic representation of portions of a telecommunications system 30 for allowing the personal computer 24 to communicate using well established communications protocols with an internet service provider (ISP) computer 32. The computer 32 communicates with a server computer 50 (at the node 22) that is typically much more powerful than the personal computer 24 at the first node 20. The server 50 executes server software that communicates with other computers in the network 10. A node having a server that conforms with the world wide web standard will typically have a hard disk storage device that stores many web pages, possibly designed and maintained by disparate entities. The term host computer is often applied to the computer 50 since that compute acts as a host for multiple world wide web pages.

The present exemplary embodiment of the invention is for use by a manufacturer of electric light bulbs which are commonly referred to as lamps. These lamps can be fluorescent or incandescent and come in a variety of sizes and exhibit a variety of light emitting properties. In the preferred embodiment of the invention the server computer 50 of FIG. 1 is a dedicated computer which hosts web pages to facilitate responses to user inquiries concerning lamps or lamp components.

In accordance with the invention, a user at the first node 20 communicates with the server 50 by making selections from a list of options presented by the server 50 on a display terminal 26. More specifically, a user controlled input device such as a mouse 28 or keyboard 29 allows one or more product choices to be selected from a list of product choices. Based on the product or products chosen by the user, a next interface display provides a number of options concerning one or more characteristics of the product and allows the user to choose from those options. The results of this selection procedure are then transmitted to the server computer 50. The server 50 then uses known data mining processes to search an available products database (typically stored on the hard drive of the server) for one or more products that produce a best fit to the customer specifications. The results of the search are conveyed back to the user over the network 10. As seen in FIG. 1 the server computer 50, may conveniently be one node of a local area network 52 having multiple other nodes which might, for example, make up a company wide intranet of the lamp manufacturer.

FIGS. 4, 5, 5A, 5B, 5C, 6, and 7 are examples of suitable web pages for use in implementing the present invention. Such web pages originate from the server computer 50 and are transmitted via the internet nodes to the personal computer 24 where they are displayed by the browser software running on that computer. A main or default screen 100

(FIG. 7) provides a number of links to other screens in a hierarchy of screen pages that become accessible by clicking on a particular link. The default screen 100 lists a number of products commonly available from a lamp manufacturer. A last link 102 on the screen 100 allows the user to bypass the interactive process of closest fit product selection and immediately go to a product order screen shown in FIG. 6.

Figure 2:
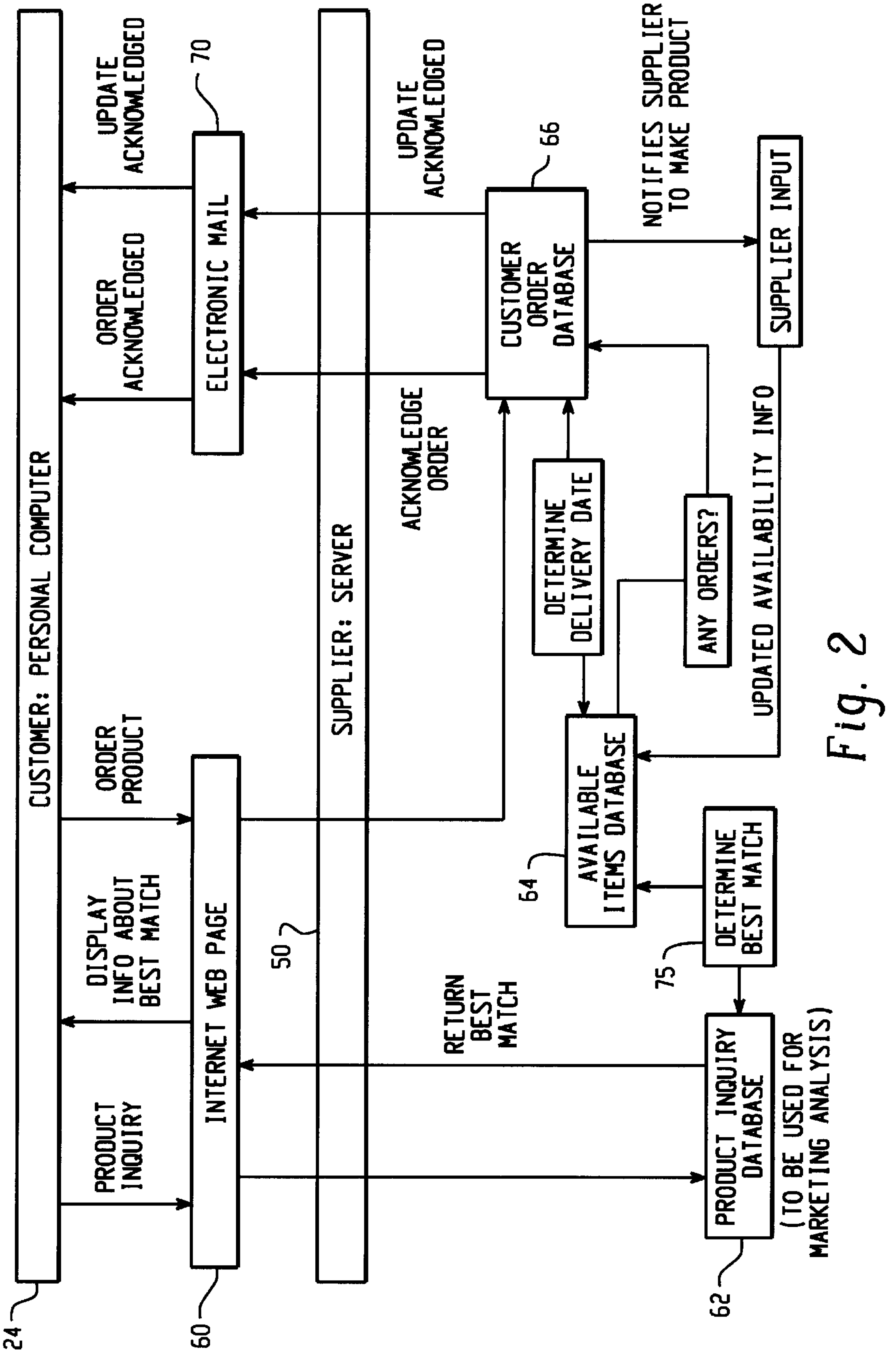
FIG. 2 is a functional block diagram of a component query process in accordance with the present invention.

The process outlined above is described in more detail in the functional block diagram of FIG. 2 and the flow charts of FIGS. 3 and 3A–3G. The customer uses the personal computer web browser to access the system by entering a UTRL for a lamp manufacturer web page 60 that lists available products in a listing on the user screen 100 with links to other pages. The FIG. 3 flowchart includes a first step 70 of locating the lamp component web page 60. Listing 1 below illustrates the hierarchical 'Product Category Guide' web page of FIG. 7.

Listing 1

Product Category Guide

Formed Components
- Nickel
- Stainless Steel
- Copper

Wire
- Molybdenum
- Tungsten
- Glass
- Order Product (102)

When viewing this page, the customer selects 71 a product type of interest such as molybedenum wire from this list of options on the screen 100 or clicks on the link 102 to an 'Order Product' page directly. Clicking on the molybedenum wire link 104 causes the server computer to display 72 a different web page for viewing by the user.

A product selection web page 62 (FIG. 4) allows the user to check on current availability of a product without having to place an actual order by entering 73 the item number into a text box 73*a*. The availability information will indicate lead time to shipment, or it will tell the user that the product is not presently available. The process of filling out the form of FIG. 4 is documented in FIG. 3A. The invention utilizes both general and specific product characteristics. (See FIG. 4). For the molybedenum wire ordering interface example of FIG. 4, the user can also control the number of potential matches by changing the diameter range in a section of the web page. Once a customer has ordered material, he or she can enter a customer number 74 each time they return to the web site. Once the form is filled out, the customer clicks on either a submit button 160 or a cancel button 162.

An available products database 64 is used to determine 75 the best match between a customer input and the available products. The available products database contains two main data portions. A first data portion 76 contains performance ratings for each characteristic of a material family. A second data portion 77 contains specific products available within each family and includes, for example, specific characteristics such as lead time and container information. The manufacturing plant updates 78 the specific characteristics based upon raw material, capacity, container, etc., constraints. After any update to a specific characteristic, the customer order database is queried 79 for open orders. If any are found, the customer order database is updated and an updated order acknowledgment is automatically sent by electronic mail 70 to the customer.

Data mining software 80 compares the customer's criteria with the performance ratings by family. The software contains algorithms 81 for determining the weight of each characteristic in determining the "match score" for that family. The software does not simply find the closest match but it also must achieve a minimum match score based upon technical requirements. (See FIG. 3Bb).

Figure 5:
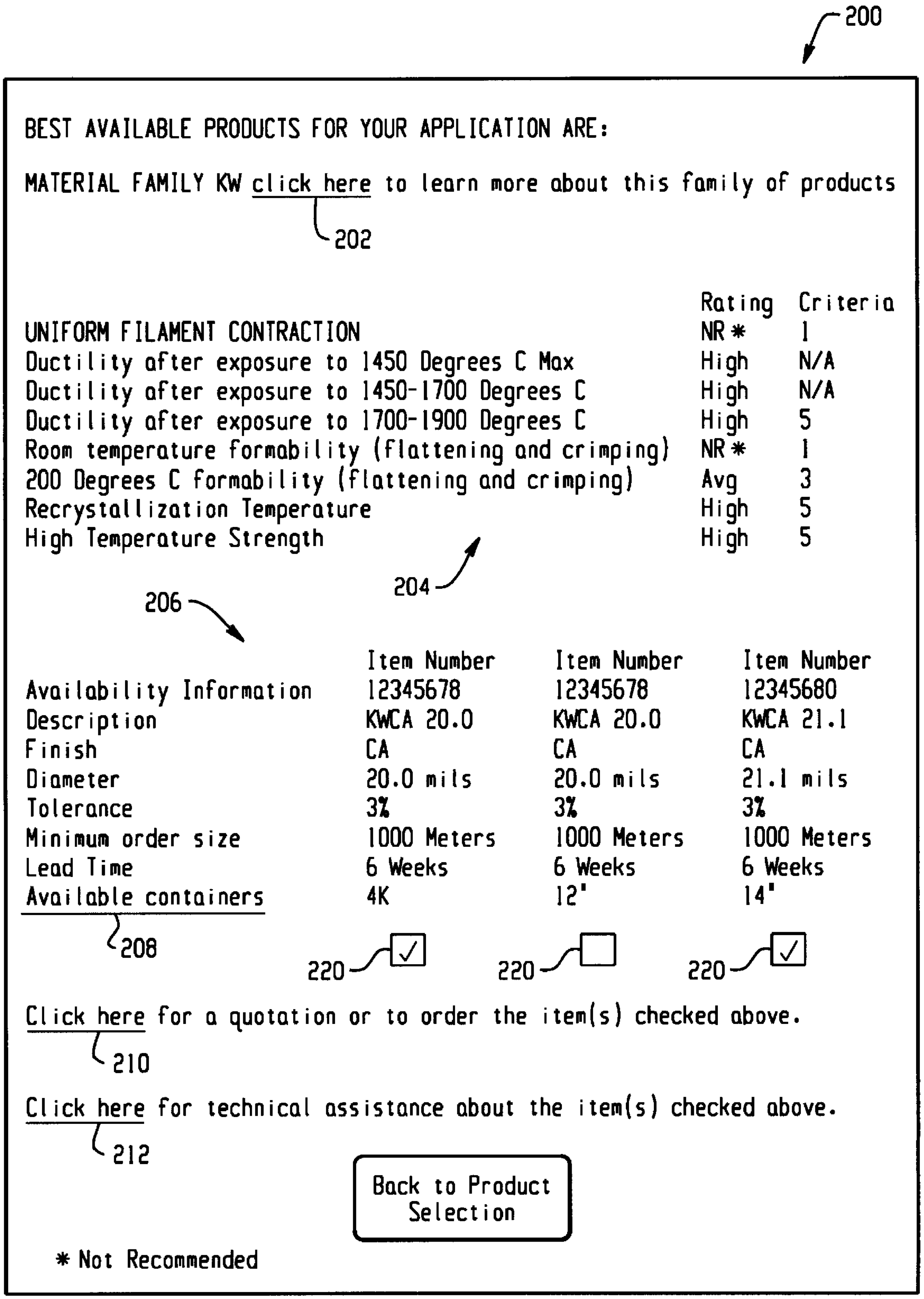

The match determination is done in two steps. At a first step 82 a general (family) match is performed. Then the specific match step 83 is performed. If there is no material family match, the screen shown in FIG. 5A is displayed 84. The user can send e-mail to an engineer for an explanation of why there was no match. If there is a material family match, but no specific product match, the screen shown in FIG. 5B is displayed 84. The user can choose to view the close matches by clicking on a link L that presents the screen shown in FIG. 5C. This allows the user to confirm that there was not a mistake in the search and that the presentation of the FIG. 5B was correct. If both the general and the specific criteria match, the screen in FIG. 5 is displayed 84.

FIG. 5 is a representative best available products screen 200. When there is a material family match, each characteristic is listed with the customer's criteria shown next to the product family rating for comparison. The user can click on a material family link 202 to see technical and performance data. The designation KW is a group of wire products made from a certain material. A separate page (not shown) lists applications and reasons for use of this family of materials, physical characteristics of this family of material and typical chemical compositions of this family of material.

A region 204 of the Best Available products page 200 contains a side by side listing of the customer's choice criteria from the previous page 62 and a product rating for the products chosen by the data mining software based on a search of the database using the customer criteria. When there is a specific product match, a next section or region 206 lists the items that meet the criteria with their values for each characteristic so the user can compare and select the optimum product. The available containers for the wire has a separate link 208 which can be selected for more information about packaging. This information relates to the material dimensions and capacity of the wire containers. The user can click on this link 208 to learn about the available containers. The user can select items of interest by checking a box 220 underneath them. The user can click on a link 210 to get a quotation on the checked items. This will display 85 the quotation/order form screen 250 (FIG. 6). The user can click on a link 212 to send an e-mail to an engineer for technical assistance. The information displayed in the screen 200 is inserted into the email and the user can add comments as desired.

Figure 3:
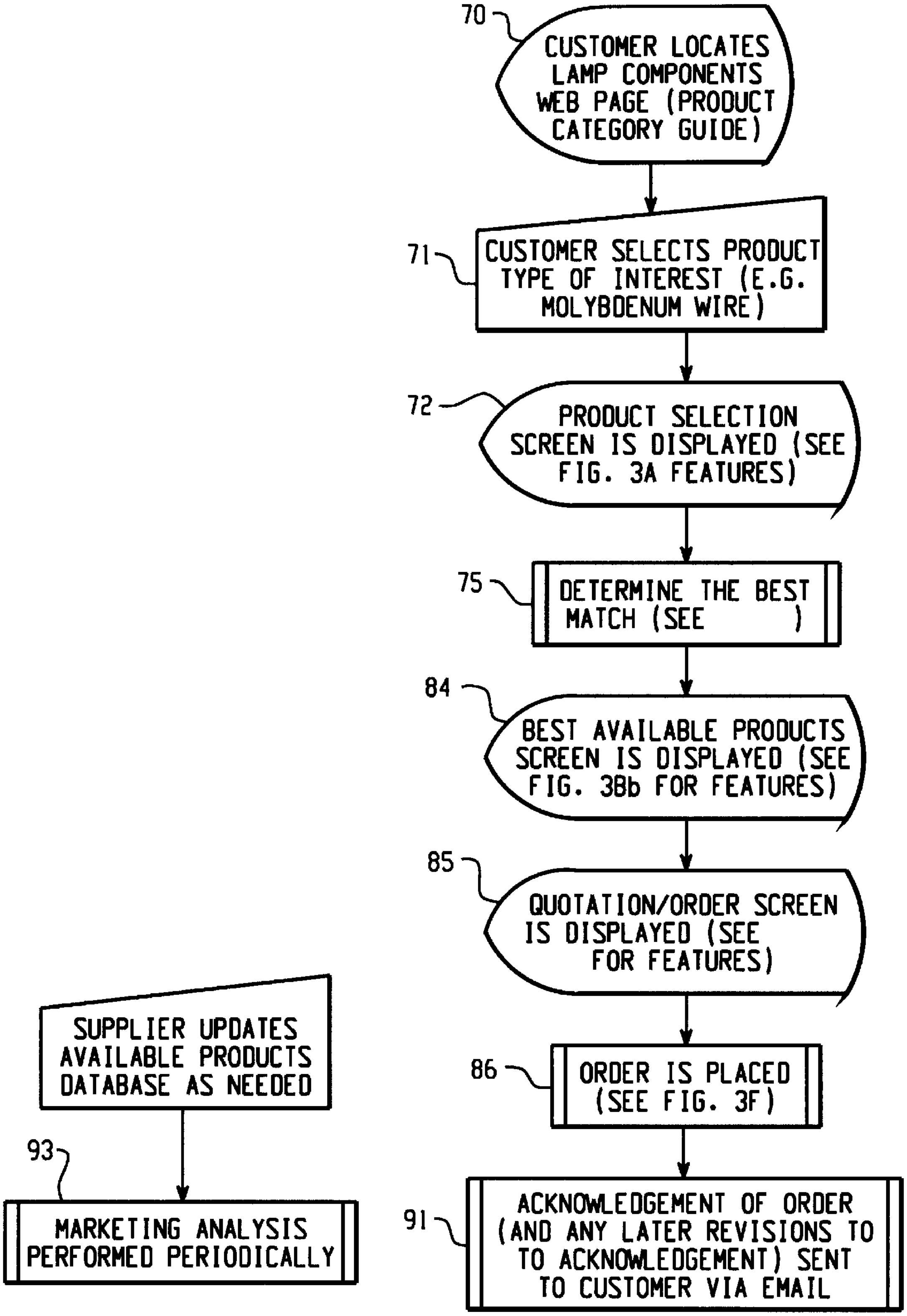
FIGS. 3 and 3A–3G are flow charts showing an interaction process between a host and client computer.
Figure 3A:
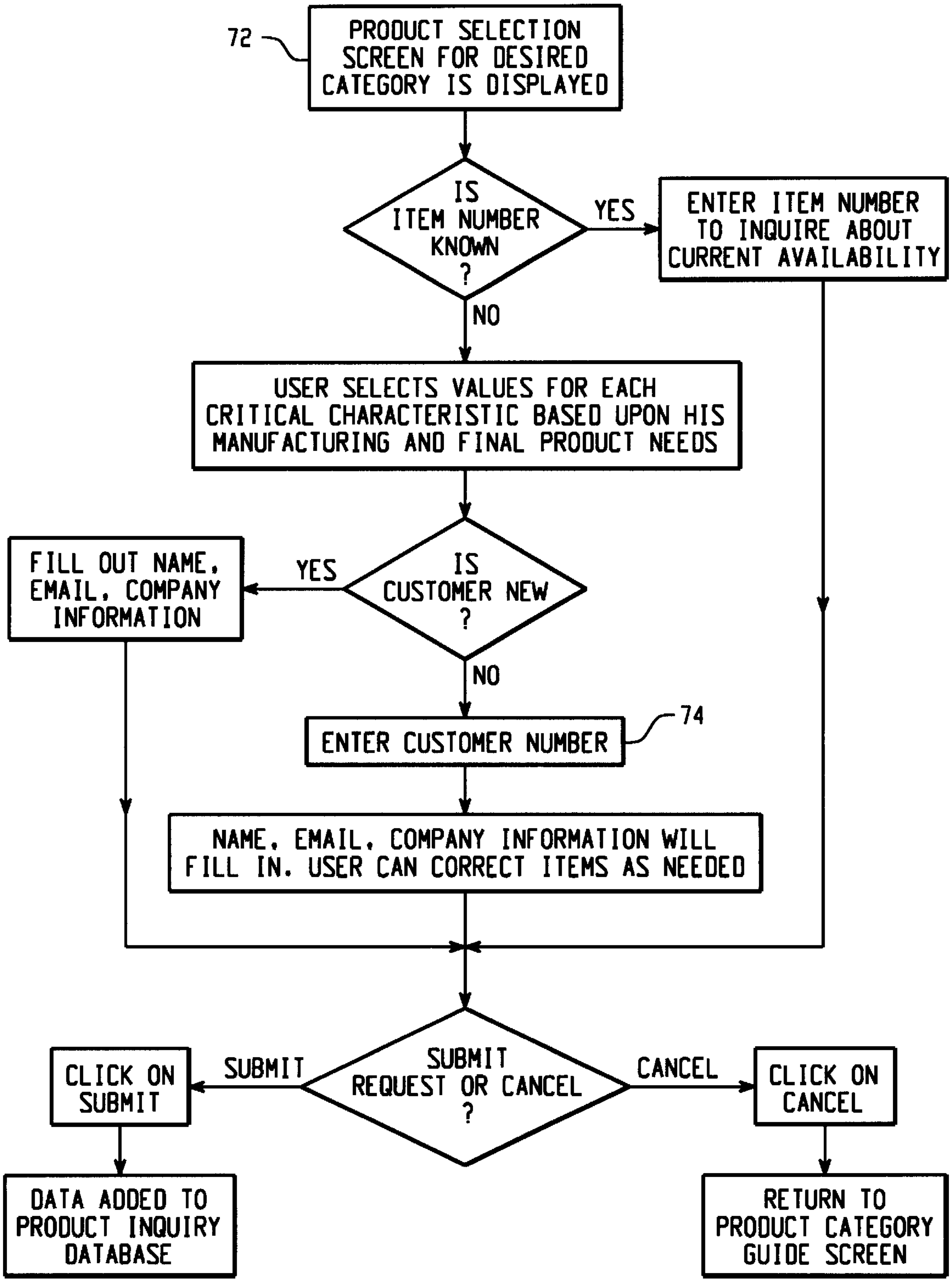
Figure 3B:
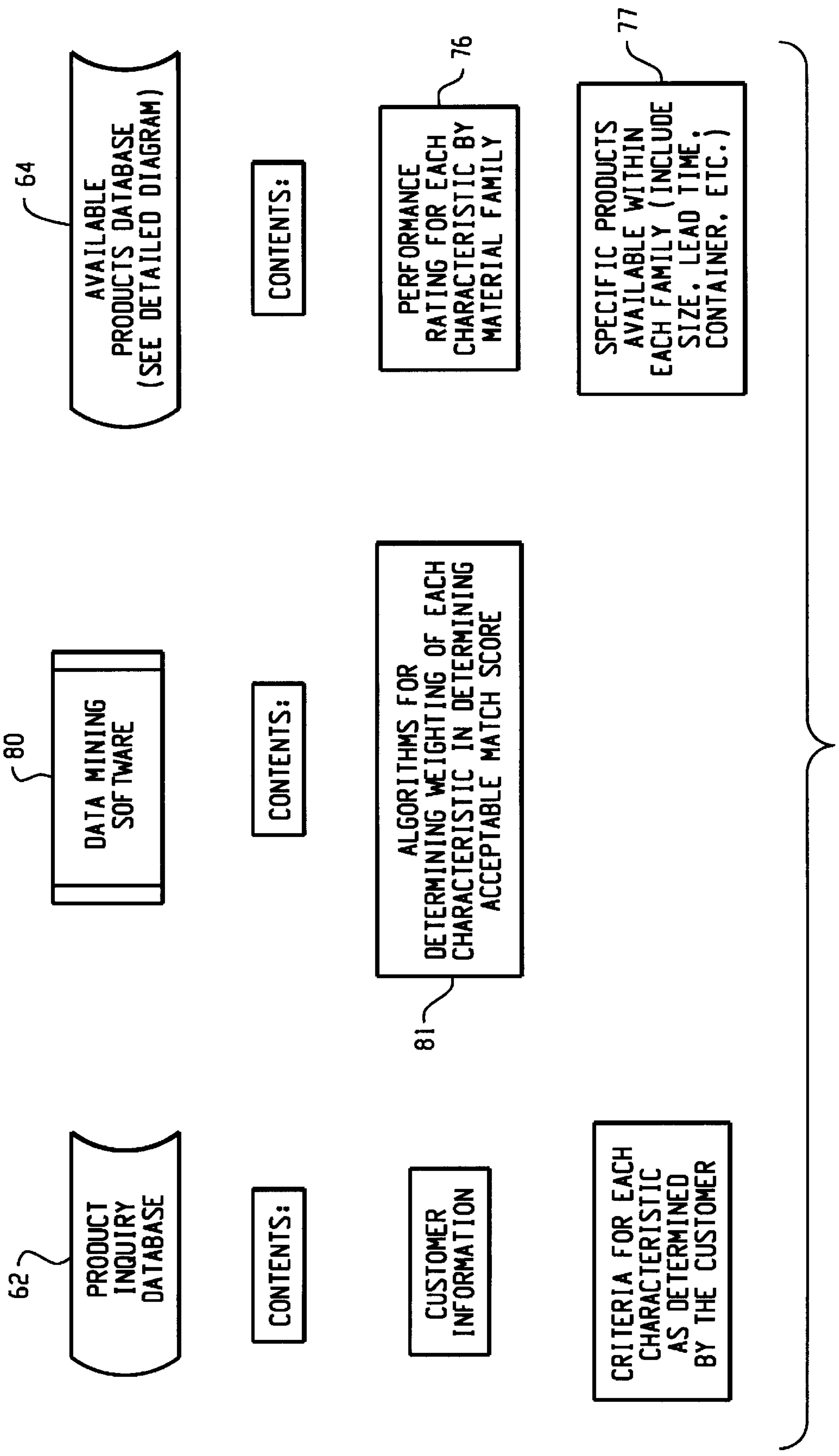
Figure 3B:
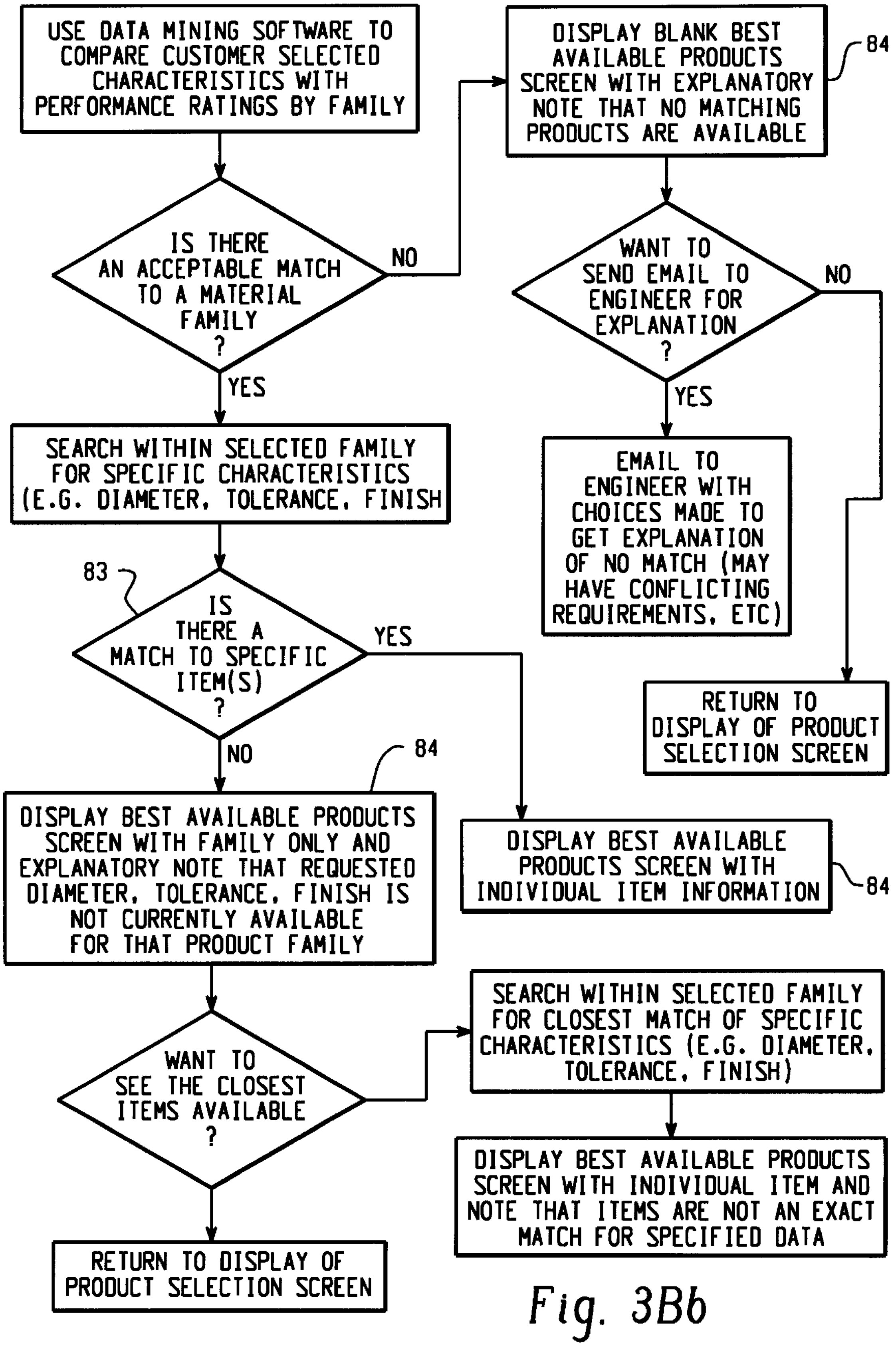
Figure 3C:
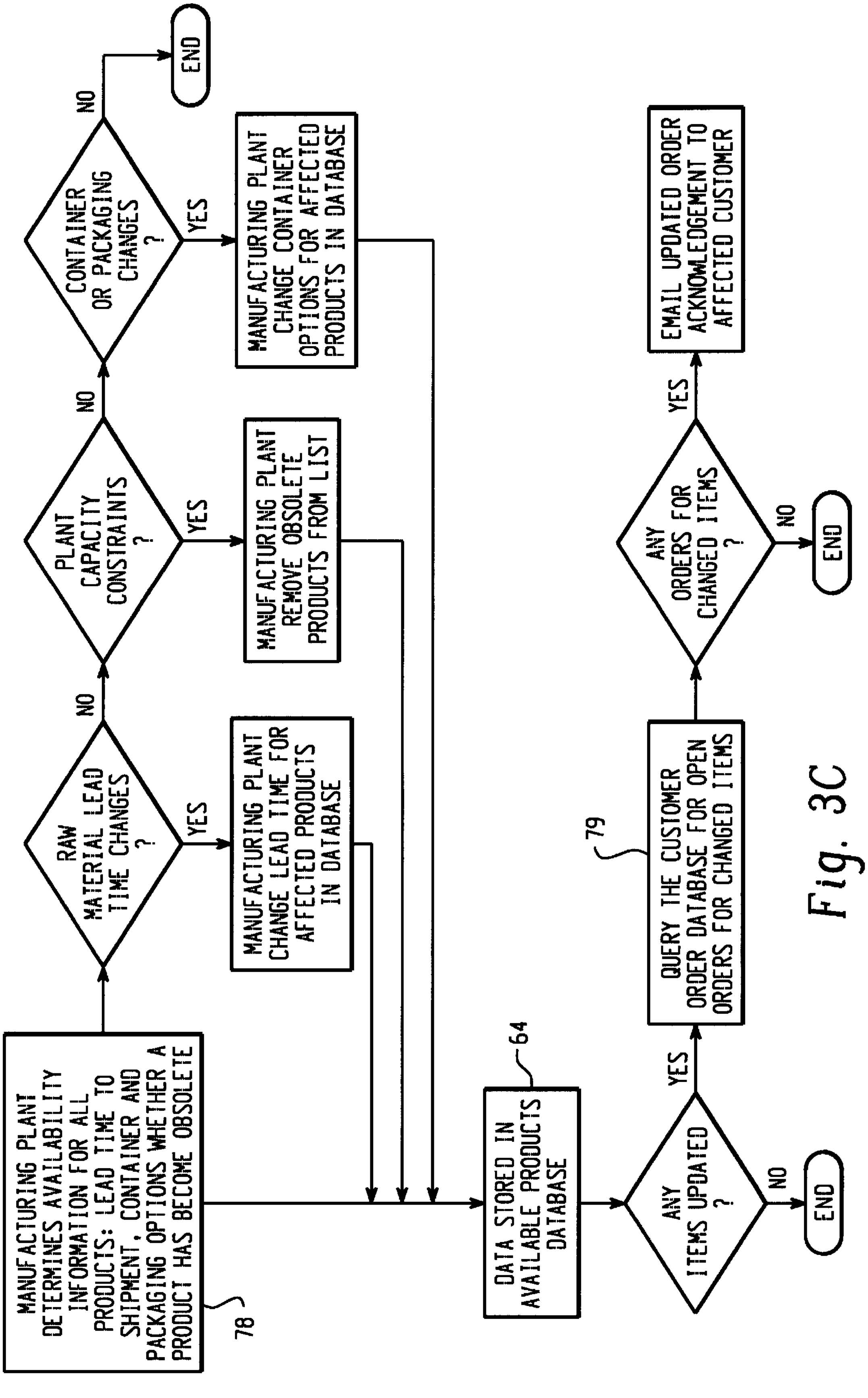
Figure 3D:
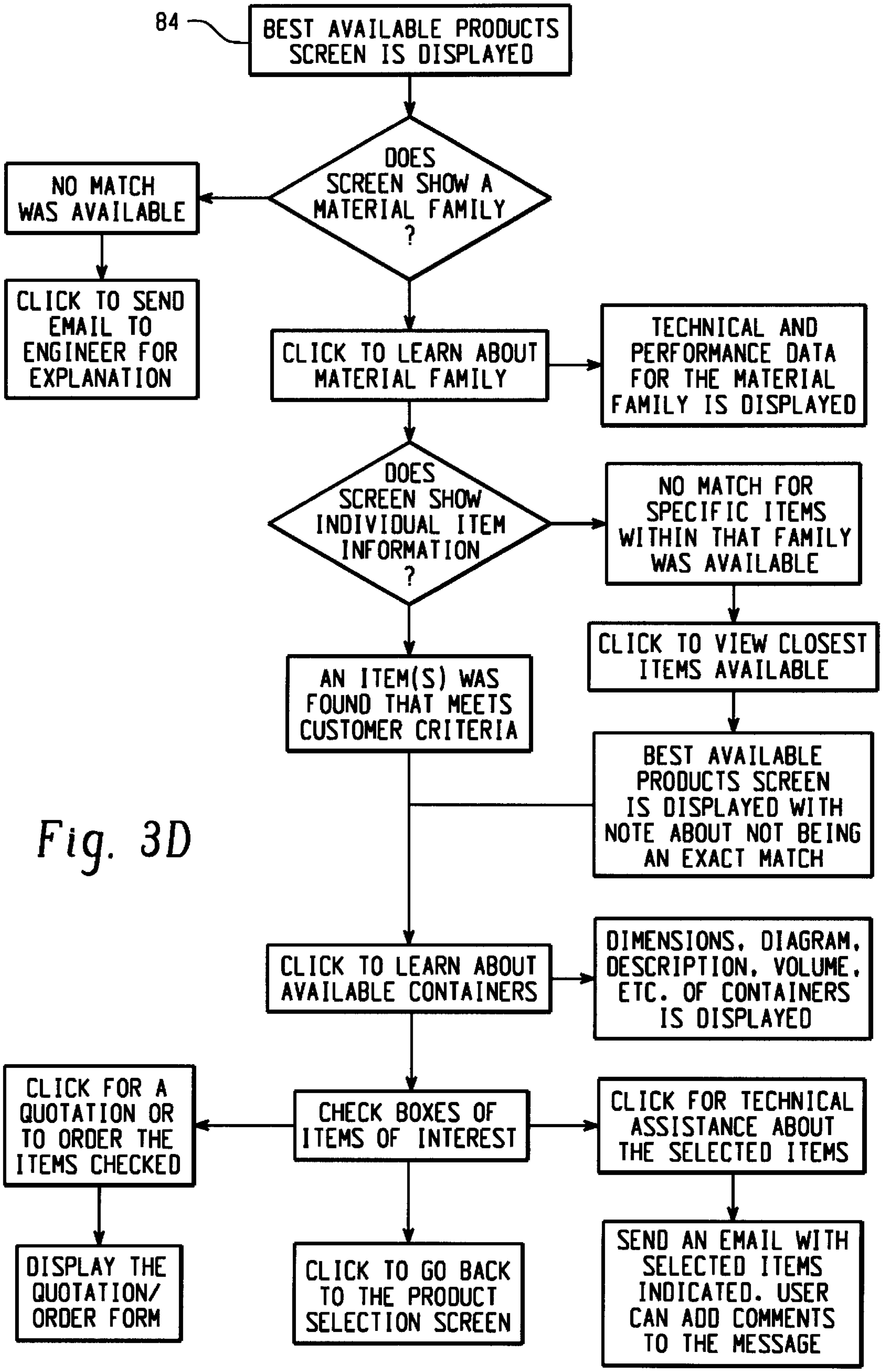
Figure 3E:
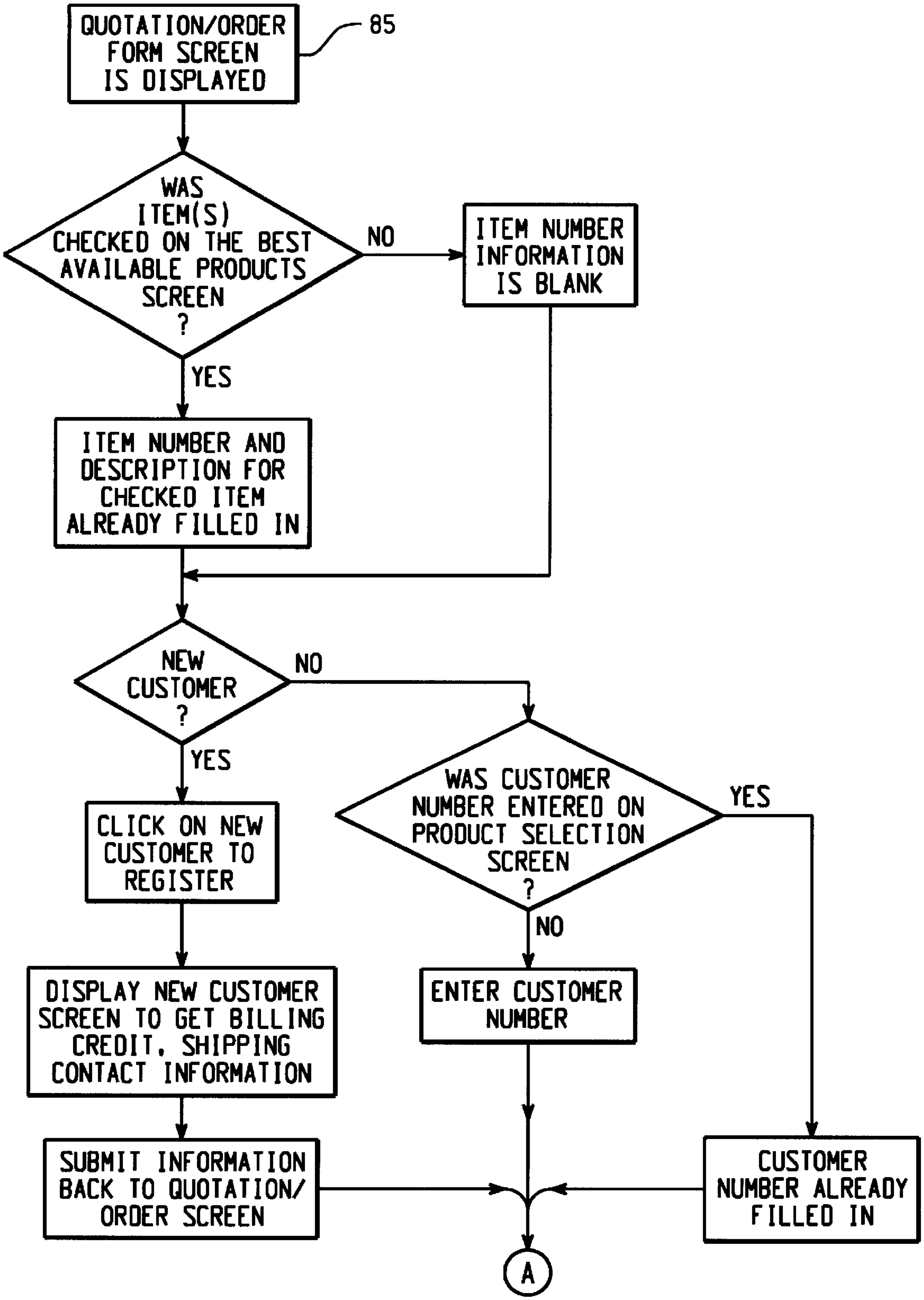
Figure 3E:
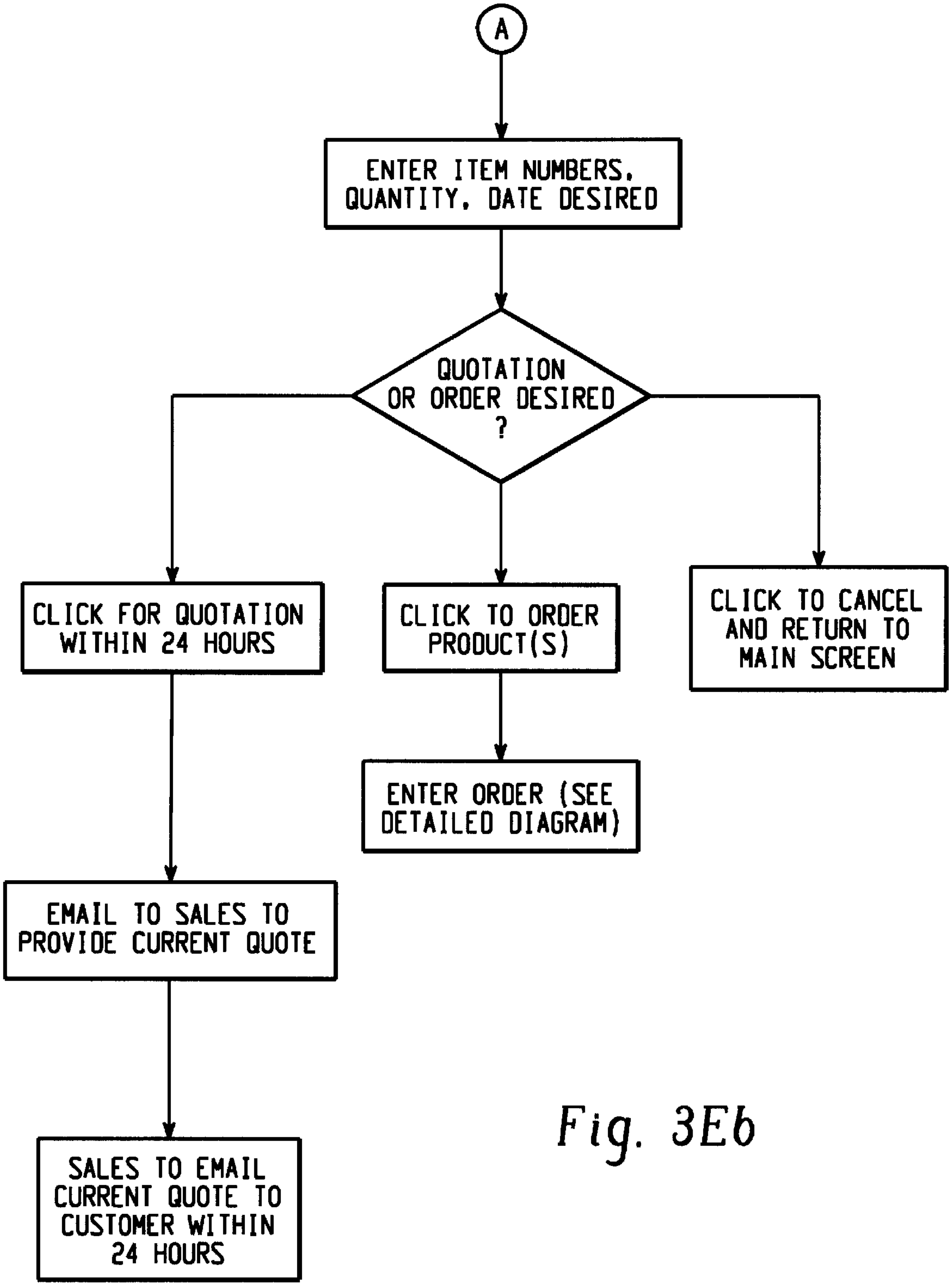

FIG. 6 is a quotation/order form web page screen 250. FIG. 3Ea and FIG. 3Eb describe the process of displaying 85 this screen in greater detail. If any items were checked in FIG. 5 or the customer number 252 was entered on a previous screen, that information will be displayed in appropriate text boxes 252, 256 on this page. If a customer is new, he or she must register by means of a link 254. The user enters and modifies the item numbers, quantities and date desired text boxes. The description is automatically updated from the item number entry in the text box. The user can ask for a current quotation by clicking on the link 258 and an e-mail is sent to the sales department to determine the price, and an e-mail response 70 is sent to the customer within a specified time such as 24 hours. The user can enter an order for the product by clicking on the link 260.

Figure 3F:
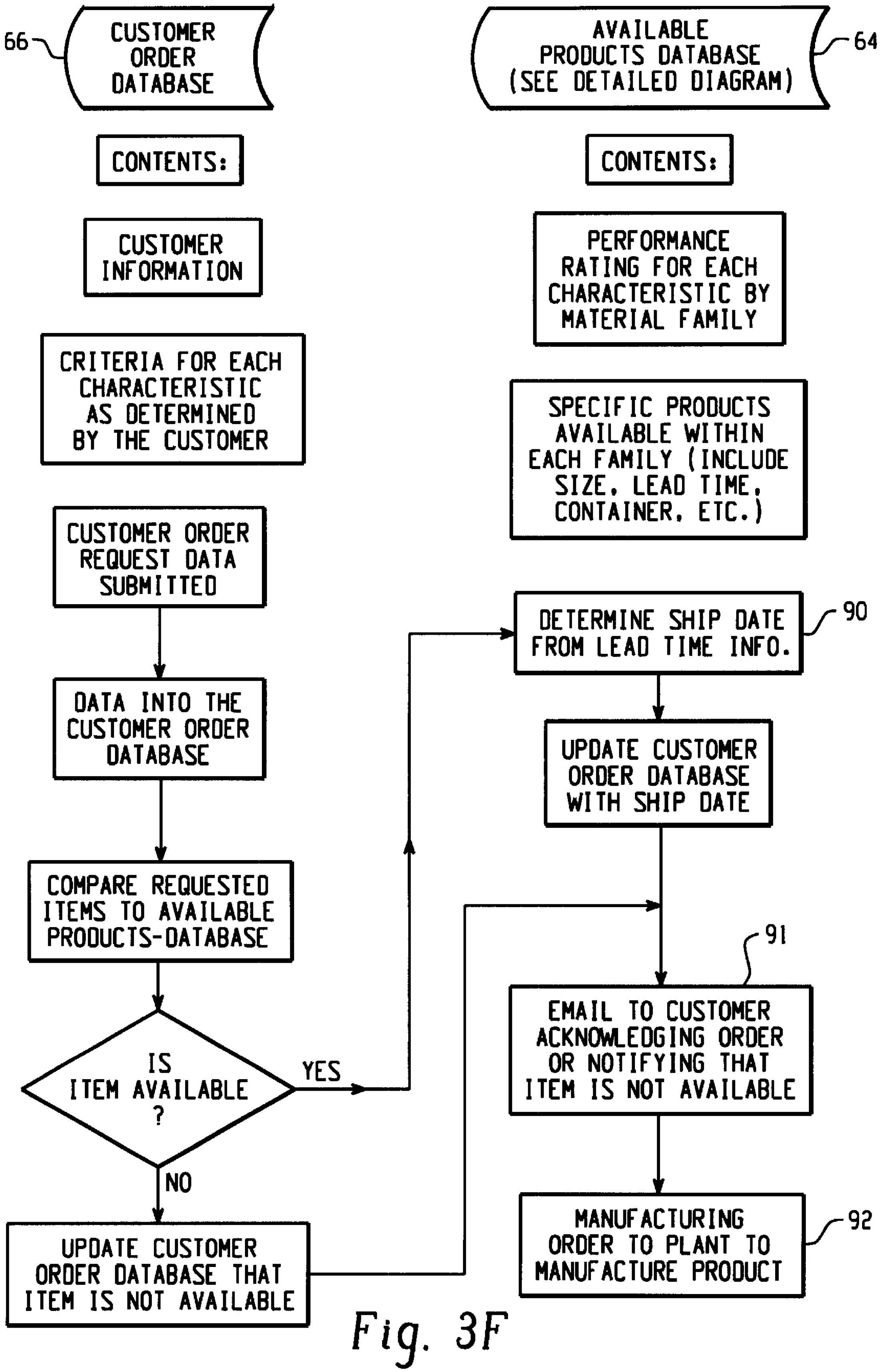

When the customer places an order 86 for the product, the requested order is entered in the customer order database 66. (FIGS. 2 and 3F). The item information is compared to the available products database 64. If the item is not available, a field in the customer order database 66 is updated to indicate this. If the item is available, the lead time is determined 90 obtained from the available products database. A ship date field in the customer order database is updated based upon the lead time. An e-mail is sent 91 to the customer acknowledging the order, listing the ship dates, and indicating if any ordered items are not currently available. This is within 24 hours. An order is sent to the manufacturing plant to manufacture 92 the product.

Figure 3G:
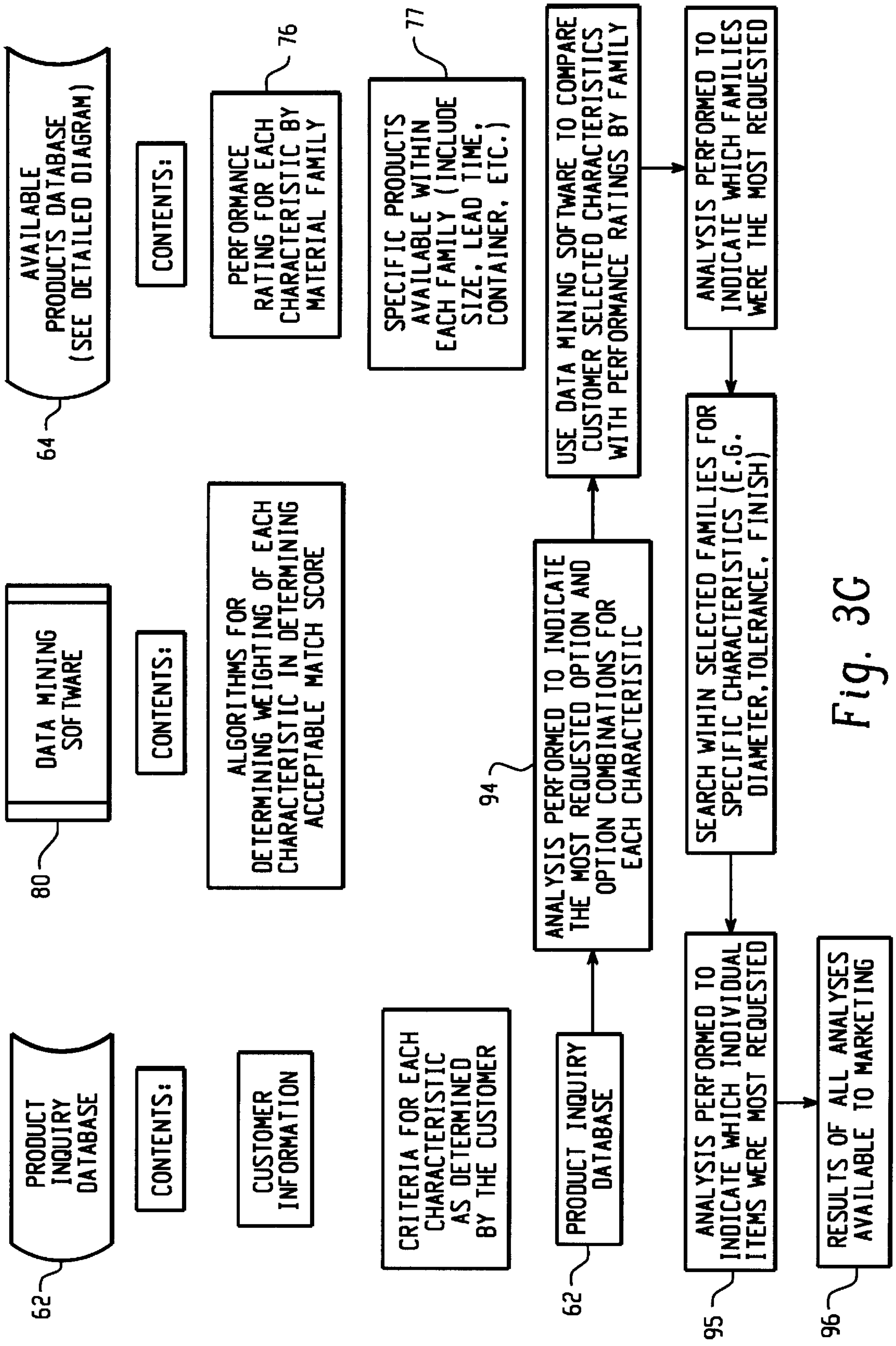

Marketing analysis 93 is performed using the steps of FIG. 3G. The data from the product inquiry database is analyzed for marketing use. Several analyses are performed. Which option and option combinations are most requested for each characteristic. Using the data mining software, material family matches with requests are determined and which product families were most requested is determined. The data mining software identifies 95 which specific products were most requested. This data is made available to a marketing department at the lamp manufacturer to determine what new products should be developed or offered.

While the application has use over the internet, the disclosed process for providing information also has application by research and development engineers seeking to learn which current product may satisfy their research needs. Thus, the company wide intranet 52 could be used by a product engineer seeking the same type of best fit information available to an outside inquiry. This capacity could be used to password protect information that would be suitable for use by company personnel but not suitable for customers.

While the present invention has been described with a degree of particularity, it is appreciated that it is the intent that the invention include all modifications and alterations from the disclosed design falling within the spirit or scope of the appended claims.

What is claimed is:

1. A method of supplying product information to a user by means of a computer interface comprising the steps of:

a) supplying a list of product choices and a means for a user to select one or more items from the list of product choices;

b) responding to the user selection of the one or more items by providing a number of product options concerning one or more characteristics of the product and allowing the user to choose from said product options;

c) updating an available products database based on manufacturing criteria, including raw material availability and plant capacity;

d) based on the user chosen product characteristics, searching the available products database for one or more products that produce a best fit to the user chosen product characteristics with product characteristics in the available products database and conveying the results of said search to the user; and e) said searching comprising the steps of assigning weights to said one or more characteristics and assigning a match score based on the user choices.

2. The method of claim 1 wherein a computer server accesses the database and further wherein the computer interface is a viewing screen on a client computer with which the server computer communicates.

3. The method of claim 2 wherein the server computer includes a data mining tool and wherein the data mining tool searches for a minimum match score to determine how the results are conveyed to the user.

4. The method of claim 2 wherein the server computer and client computers communicate over a local area network within a manufacturing facility.

5. The method of claim 1 wherein the product characteristics relate to lamps or lamp components.

6. The method of claim 1 wherein the characteristics of the product include both one or more material family characteristics and one or more specific product characteristics.

7. The method of claim 1 additionally comprising the step of electronically mailing a revised confirmation of open orders to a customer based on an updating of the available products database.

8. The method of claim 1 additionally comprising the step of accepting an order for a product from the user and updating a product order database.

9. The method of claim 8 additionally comprising the step of electronically mailing a confirmation of the order for the product.

10. The method of claim 8 additionally comprising the step of ascertaining product availability before accepting an order for a product.

11. The method of claim 1 wherein the computer interface provides an option for placing an order or receiving information about a specific product without resort to a search of the available products database for the purposes of performing a best fit search of said available products database.

12. The method of claim 11 wherein the step of placing an order or receiving information is initiated by the step of entering a product number into a text box and selecting a submit option.

13. The method of claim 12 wherein a response to the step of placing an order or requesting information provides the user with product availability and time to shipment.

14. Apparatus for supplying product information to a user by means of a computer interface comprising:

a) means for supplying a list of product choices and a means for a user to select one or more items from the list of product choices;

b) means for responding to the user selection of the one or more items by providing a number of options concerning one or more product characteristics and allowing the user to choose from said options; and c) means for searching a product specification database for one or more products that produce a best fit to the user chosen product options and conveying the results of said search to the user wherein the means for searching assigns weights to said one or more characteristics and then assigns a match score based on the user choices, the means for searching including, assigning a first family of materials match score and a second specific products match score, wherein the results of said search that are conveyed differ depending on the results of the search achieving a minimum match score for both the family of materials and the specific products within the family.

15. The apparatus of claim 14 wherein the means for supplying the list of product choices is a server computer communicating with a computer network and further comprising a first computer for maintaining an available products database.

16. The apparatus of claim 15 additionally comprising a computer for maintaining a customer order database.

17. The apparatus of claim 16 wherein the server computer can accept orders that are placed in the customer order database and also can confirm placement of the orders by electronic mail.

18. A client/server system for supplying product information to a potential user of lamps or lamp components comprising a server computer executing a stored computer program for:

a) supplying a list of lamp choices and having an interface for communicating the list of lamp choices to a user to select one or more items from the list of lamp choices;

b) responding to the user selection of the one or more items by providing a number of options concerning one or more characteristics of the lamp or lamp component product and communicating via the interface with the user to allow the user to specify said options;

c) updating an available product database based on manufacturing criteria, including raw material availability and plant capacity; and d) searching an available product database for one or more lamp products that produces a best fit to the customer specifications and communicating the results of said search to the user, said searching performed by assigning weights to the product characteristics and determining a match score using the assigned weights and the selected user options.

19. The client/server system of claim 18 wherein the server computer stores web pages for communication to the user by means of a computer network.

20. The client/server system of 18 wherein the server computer includes software for data mining of the database to determine the best fit by assigning weights to the user chosen characteristics of the lamp or the lamp components.

21. The client/server system of claim 18 additionally comprising other computers for storing one or more database for use by the server computer in determining the best fit.

22. The client/server system of claim 19 wherein the web pages include links to pages for placing an order without making a best fit determination.

23. The client/server system of claim 18 wherein in addition to an available product database the server computer maintains a) a product inquiry database and b) a customer order database.

* * * * *